Dec. 9, 1941.    F. J. FRUTH    2,265,524
GOVERNING SYSTEM FOR MOTOR VEHICLES
Filed July 13, 1940
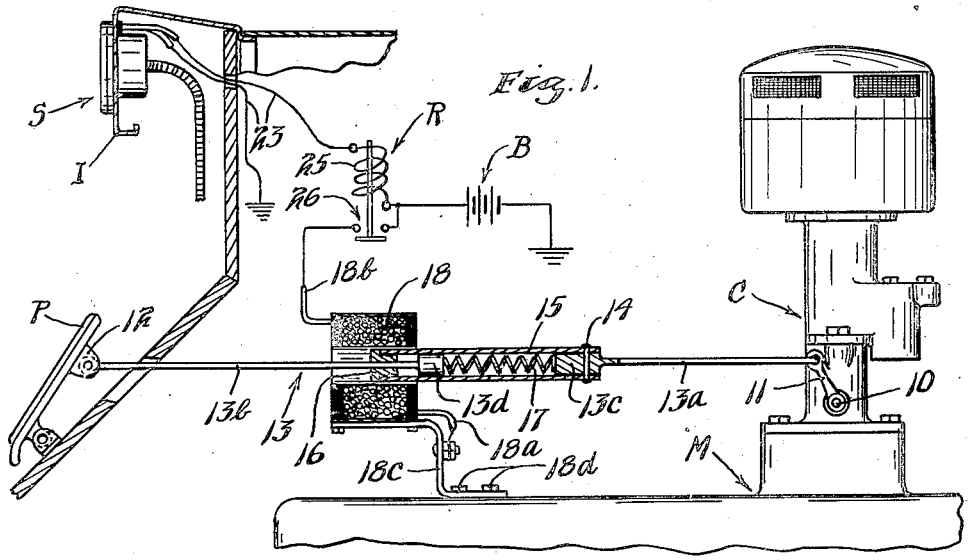
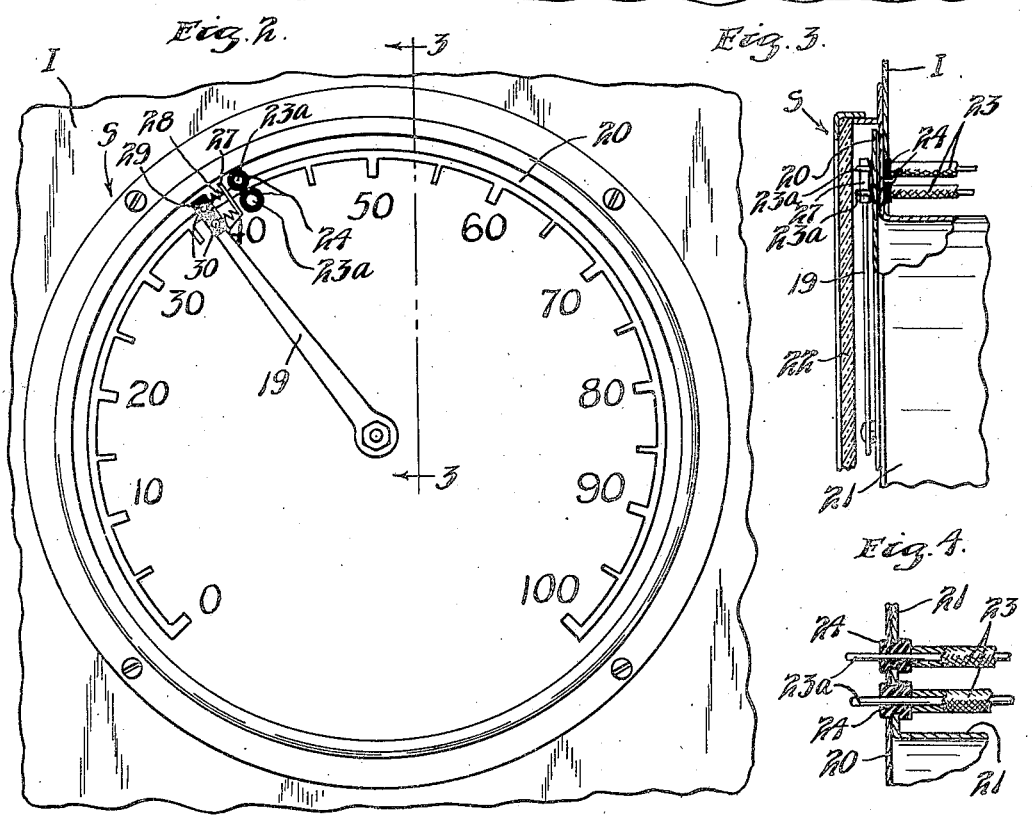
INVENTOR.
FRANK J. FRUTH.
BY HIS ATTORNEYS
Williamson & Williamson Patented Dec. 9, 1941

2,265,524

UNITED STATES PATENT OFFICE 2,265,524

GOVERNING SYSTEM FOR MOTOR VEHICLES

Frank J. Fruth, Brainerd, Minn., assignor of one-third to John C. Thompson, Brainerd, Minn.

Application July 13, 1940, Serial No. 345,369

3 Claims. (Cl. 137—139)

My invention relates to speed governing apparatus and particularly to systems for governing the speed of motor vehicles.

To enable automatic observance of motor vehicle speed limit laws and to avoid damage to and excessive wear of motor vehicles and their working parts such as would be caused by high speed, it is highly desirable that motor vehicle speed governing apparatus of simple and inexpensive construction be provided. It is considered by many people that governing equipment responsive to vehicle speed rather than engine speed is preferable.

An object of my invention is to provide a motor vehicle speed governing system which is particularly effective and reliable, which operates responsive to vehicle speed rather than engine speed, which performs its speed limiting function irrespective of the position of the driver's fuel feed control, and which does not interfere in any way with acceleration or operation of the vehicle in a speed range below the speed limit for which the system is set.

Another object is to provide such a governing system wherein control is effected by electrical means and wherein any failure of the electrical means or the supply of electrical energy therefor will not prevent operation of the motor vehicle in the manner of the ordinary ungoverned vehicle.

Still another object is to provide such an electrically controlled governing system wherein no electrical energy or mechanical energy is consumed by the system as long as the speed limit for which the system is arranged is not reached.

Yet another object is to provide such a system which may be installed in a vehicle largely by addition and substitution of parts in accordance with my invention and with a minimum of modification of original parts of the vehicle.

A further object of the invention is to provide such a system of simple, light, compact and inexpensive construction and capable of being quickly and easily installed in any type of motor vehicle.

These and other objects and advantages of the invention will more fully appear from the following description made in connection with the accompanying drawing, wherein like reference characters refer to the same parts throughout the views, and, in which:

Fig. 1 is a general view of portions of a motor vehicle with an embodiment of my invention operatively associated therewith, a portion of my governing apparatus being shown in section and the electrical connections thereof being shown diagrammatically;

Fig. 2 is a front view of the speedometer of the vehicle of Fig. 1 showing an electrical contact element comprising a portion of my governing system built thereinto;

Fig. 3 is a partial sectional view of the speedometer of Fig. 2 taken along the line 3—3 of Fig. 2 as indicated by the arrows; and Fig. 4 is a partial view drawn to somewhat enlarged scale showing certain details of the structure of Figs. 2 and 3.

Referring to the drawing, an embodiment of my invention is shown operatively associated with parts of an ordinary motor vehicle including a speedometer S, a vehicle battery B, a carburetor C of conventional design including the usual throttle valve shaft 10 carrying a throttle shaft actuating element or arm 11 which, in the conventional vehicle, is ordinarily connected, through motion-transmissive mechanism such as a link rod, to an operator's fuel feed control element such as the foot operated pedal P of Fig. 1. For connection thereto of the link rod of the conventional fuel feed control mechanism the free end of the throttle valve actuating arm 11 is customarily apertured and the pedal P is provided with an apertured lug 12 as indicated in Fig. 1.

Broadly described, my system consists of lost motion means interposed in motion-transmissive mechanism connecting an operator's control element to the throttle valve actuating element of a motor vehicle, resilient means associated with the lost motion means to prevent lost motion therein during a normal throttle-opening operation, electromagnetic means arranged for operation to shift the throttle valve toward closed position against the opposition of the resilient means, and means working responsive to vehicle speed to bring about energization of the electromagnetic means when the vehicle has attained a predetermined speed. These components of my system are shown in the drawing as they are constructed for operative association with one particular commonly used construction and arrangement of the original parts of a motor vehicle. The arrangement of the carburetor C and the throttle valve thereof is assumed to be such that the throttle valve is closed when the throttle arm 11 is in the position shown in Fig. 1 and open when the throttle arm 11 is swung to the right as viewed in Fig. 1. In such a case a link rod connecting the pedal P to the throttle arm 11 would be under longitudinal pressure stress during a throttle-opening operation effected by depressing the pedal P and would move substantially longitudinally to the right.

In applying my system to motor vehicle parts such as those shown in Fig. 1, I substitute for the usual continuous link rod which interconnects the pedal P and the throttle arm 11 a link rod 13 which is divided into two axially aligned, spaced rod sections 13a and 13b connected together by lost motion means. The right-hand end of the rod section 13a is connected to the apertured free end of the throttle arm 11, and the left-hand end of the rod section 13b is connected to the apertured lug 12 of the pedal P in the same manner as that employed in connecting the respective ends of the ordinary link rod to the arm 11 and lug 12. To provide lost motion means in the medial portion of the rod 13 I prefer to secure, as by means of a pin 14, the right-hand end of a tubular member 15 to the inner or left-hand end of the right-hand rod section 13a, the inner end of the rod section 13a being enlarged in diameter at 13c to fit the interior diameter of the tubular member 15 and the right-hand end of the tubular member 15 being telescopically mounted on the enlarged portion 13c. The inner or right-hand end of the left-hand rod section 13b is disposed in the interior space of the tubular member 15 and is provided with an enlarged element 13d fitting within the tubular member 15 for sliding movement longitudinally thereof so as to enable lost motion action.

A plug 16, centrally apertured to accommodate and guide the left-hand rod section 13b, is secured in the left-hand end of the tubular member 15 in encircling relation with the rod section 13b to function as a stop to prevent complete withdrawal of the rod section 13b from the tubular member 15.

Resilient means is provided to normally maintain the enlarged element 13d in abutment with the stop plug 16. This means may consist, as shown, of a helical compression spring 17 contained within the tubular member 15 and pressing at its respective ends against the enlarged inner end 13c of the right-hand rod section 13a and the enlarged element 13d carried by the right-hand end of the left-hand rod section 13b.

By means of the above described lost motion means the effective length of the rod 13 may vary between limits determined respectively by abutment of the enlarged element 13d against the stop plug 16 and complete compression of the spring 17. The spring 17 tends to maintain the effective length of the rod 13 at a maximum and is of such strength and is so preloaded as to maintain maximum length of the rod 13 against the longitudinal pressure imposed thereon incidental to a throttle-opening operation produced by depressing the pedal P. The strength of the spring 17 is, however, so limited that a force thereon slightly exceeding that occasioned by a throttle-opening operation will cause yielding of the spring 17 and consequent shortening of the effective length of the rod 13. With the pedal P held in a given position, shortening of the effective length of the rod 13 will cause shifting of the throttle arm 11 toward the position thereof corresponding to a closed position of the throttle valve of the carbureter C.

Electromagnetic means is provided and arranged for operation thereof to shift the throttle arm 11, against the pressure of the spring 17, toward a position thereof corresponding to a closed position of the throttle valve of the carbureter. While such electromagnetic means may take various forms and be associated with the throttle shaft 10 in various manners I consider it preferable to employ a type of construction therefor enabling close association thereof with the previously described lost motion telescopic joint and utilization of a portion of the telescopic joint as a part thereof in the interests of simplicity, low cost and easy installation. To this end I form the tubular member 15 of magnetic material whereby it may function not only as a portion of the lost motion means but also as an electromagnetic plunger which may be acted upon by an electromagnetic solenoid. The thickness of the wall of the tubular member 15 may, of course, be made to suit the requirements of electromagnetic design for proper co-operation with a solenoid of a given design. A solenoid 18 having an internal diameter somewhat exceeding the external diameter of the tubular plunger 15 is fixedly mounted by means of a suitable bracket 18c in substantially co-axial relation with the tubular plunger 15 and in a position suitably spaced to the left of the center of the plunger 15 so that energization of the solenoid 18 will cause the same to exert a leftward pull on the plunger 15 to pull the throttle arm 11 to the left. The solenoid 18 is designed to have sufficient strength to overcome the pressure of the spring 17 so as to shift the throttle arm to the left while the pedal P is forcibly held in depressed position. The solenoid mounting bracket may be secured to any suitable part of the motor vehicle and is shown in Fig. 1 as being secured to the intake manifold M of the vehicle by means of screws 18d.

Electrical energy for operating the solenoid 18 may be obtained from a battery such as the battery B diagrammatically indicated in Fig. 1 and which may be the starting, lighting and ignition battery of the vehicle. Since one terminal of a vehicle battery is customarily "grounded" to the vehicle chassis and engine, one terminal wire 18a of the solenoid 18 may be connected to the bracket 18c, as indicated in Fig. 1, so that energization of the solenoid 18 may be effected by establishing an electrical connection between the ungrounded end of the battery B and the remaining terminal wire 18b of the solenoid 18.

I provide means working responsive to speed of the vehicle to make the above mentioned solenoid-energizing electrical connection when the vehicle has attained a predetermined speed. While various types of speed-responsive electrical circuit-controlling devices may be used to attain my purpose, I prefer to employ contact-making means installed in and making use of the parts of the speedometer S of the vehicle. The type of speedometer in general use at the present time includes a speed indicating pointer which moves over a stationary scale calibrated in terms of vehicle speed. Such a speedometer S is shown in the drawing mounted on an instrument panel I and including, as shown in Figs. 2, 3 and 4, a pointer 19 working over a speed-calibrated scale 20. In accordance with usual practice the speedometer S includes a case or housing 21 and is equipped with a transparent front 22 spaced from the scale 20. For my purpose I provide a pair of electrical contact elements spaced radially of the speedometer S in the path of the pointer 19 and supported by the speedometer structure at a selected point on the speed scale 20 corresponding to the speed to which my system is desired to limit the vehicle. A pair of electrically conductive contact elements 23a, which may be the electrical conductors of a pair of wires 23, as indicated in Figs. 3 and 4, are projected through suitably apertured parts of the speedometer structure including the scale 20 to project into the path through which the pointer 19 moves in traversing the scale 20. The contact elements 23a are insulated from the speedometer parts through which they project by means of electrical insulating bushings 24 which are preferably designed so as to secure the contact elements 23a in the above described positions thereof. As previously mentioned, the position of the pair of contact elements 23a on the scale 20 is in accordance with the desired maximum vehicle speed and, when such speed has been attained by the vehicle, the pointer 19 will have approached the pair of contact elements 23a. The free end portion of the pointer 19 carries a block 29 of electrical insulating material secured thereon by suitable means such as the rivets 30. A plate 27 of electrically conductive material is disposed to the right of the insulating block 29 in spaced relation therewith and is positioned in radial relation with the speedometer scale 20 in a plane normal thereto. A pair of helical springs 28 are joined to the right hand portion of the insulating block 29 by suitable means as, for example, by each spring 28 having its left hand end moulded into the insulating block 29. The contact plate 27 is secured to the free ends of the springs 28 in a suitable manner such as, for example, being soldered thereto. As the speedometer pointer 19 approaches the contact elements 23a, the contact plate 27 will engage the contact elements 23a to establish an electrical connection therebetween whereby the contact elements 23a and the plate 27, in combination with the speedometer S, form a speed-responsive electrical switch which may be employed to control energization of the solenoid 18. The pair of springs 28 enable a rocking action of the contact plate 27 so that the same will be capable of assuming a position wherein both of the contact elements will be engaged thereby.

While the above described speed responsive switch might be used for direct control of a circuit from the battery B to the terminal wire 18b of the solenoid 18, I prefer to interpose an electromagnetic relay R to enable delivery of ample current to the solenoid 18 without imposing a severe duty on the above described switch. The relay R includes an operating coil 25 which, as indicated in Fig. 1, is connected between the ungrounded end of the battery B and one of the wires 23 leading to the contact elements 23a and the remaining wire 23 is grounded as indicated in Fig. 1, whereby engagement of the contact plate 27 with the contact elements 23a will cause energization of the relay coil 25 to close the contacts 26 of the relay R. The contacts 26 of the relay R are connected between the ungrounded end of the battery B and the ungrounded terminal wire 18b of the solenoid 18 whereby the solenoid 18 will be energized responsive to closure of the relay contacts 26.

During operation of the vehicle at speeds below the speed indicated by the position of the contact element 23a on the speedometer scale, the fuel feed controlling equipment of Fig. 1 will operate in the same manner as that of any conventional motor vehicle not including any governing means. If the vehicle is so operated that its speed tends to exceed the selected speed for which my system is arranged to govern, then the solenoid 18 will be energized when the vehicle speed reaches the selected speed, as should be apparent from the foregoing description. The solenoid will then act upon the magnetic plunger 15 to shift the throttle valve toward closed position against the pressure of the spring 17 of the lost motion means so as to cause reduction of the speed of the vehicle. Reduction of the vehicle speed below the selected speed will cause de-energization of the solenoid 18 whereupon the spring 17 of the lost motion means will shift the throttle in a throttle-opening direction. From this, it should be apparent that, when the fuel feed pedal P is held in a position tending to produce a vehicle speed in excess of the selected speed, alternate action of the solenoid 18 and the spring 17 will oscillate the throttle about a degree of opening thereof which will keep the vehicle at the selected maximum speed for which my governing system has been arranged.

It should be apparent that I have invented a novel, simple, light, compact, rugged, effective and inexpensive form of speed governing system for motor vehicles.

It will, of course, be understood that various changes may be made in the form, details, arrangement and proportions of the various parts without departing from the scope of my invention.

What is claimed is:

1. Linkage mechanism for actuating and governing the throttle valve of an engine, having in combination, an operator's shiftable control element, a solenoid energizable responsive to speed control, a tubular member having abutments adjacent the two ends thereof, said member constituting an electro-magnetic plunger slidable in said solenoid, a link rod slidable in said tubular member and having one of its ends connected with said shiftable control element, the opposite end of said rod having an abutment element disposed within said tubular member, an actuating connection between said tubular member and said throttle valve, and resilient means within said tubular member interposed between the abutment at one end thereof and the abutment on said link rod, said resilient means being yieldable only responsive to a force exceeding that imposed thereon during a valve-opening operation.

2. Linkage mechanism for actuating and governing the throttle valve of an engine, having in combination, an operator's shiftable control element, a solenoid, means for supporting said solenoid in a fixed, substantially horizontal position between said shiftable control element and said throttle valve, a tubular member having abutments adjacent the two ends thereof, said member constituting an electro-magnetic plunger slidable in said solenoid, a link rod slidable in said tubular member and having one of its ends connected with said shiftable control element, the opposite end of said rod having an abutment element disposed within said tubular member, an actuating connection between said tubular member and said throttle valve, and resilient means within said tubular member interposed between the abutment at one end thereof and the abutment on said link rod, said resilient means being yieldable only responsive to a force exceeding that imposed thereon during a valve-opening operation.

3. Linkage mechanism for actuating and governing the throttle valve of an engine having in combination, an operator's shiftable control element, a solenoid, means for supporting said solenoid in a fixed relation between said control element and said throttle valve, a tubular member having abutments adjacent two ends thereof, said member constituting an electro-magnetic plunger slidable in said solenoid, a link rod slidable in said tubular member and having one of its ends connected with said shiftable control element, the opposite end of said rod having an abutment element disposed within said tubular member, resilient means disposed within said tubular member and interposed between the abutment on said link rod and the outer end of said tubular member, said resilient means being yieldable only responsive to a force exceeding that imposed thereon during a valve-opening operation, and a link connected with the outer end of said tubular member and said throttle valve.

FRANK J. FRUTH.